United States Patent
Pi

(10) Patent No.: US 8,259,664 B2
(45) Date of Patent: Sep. 4, 2012

(54) METHOD AND APPARATUS FOR RESOURCE ALLOCATION IN A COMMUNICATION SYSTEM

(75) Inventor: Zhouyue Pi, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 339 days.

(21) Appl. No.: 12/590,462

(22) Filed: Nov. 9, 2009

(65) Prior Publication Data
US 2010/0124197 A1 May 20, 2010

Related U.S. Application Data

(60) Provisional application No. 61/199,234, filed on Nov. 14, 2008, provisional application No. 61/199,346, filed on Nov. 14, 2008.

(51) Int. Cl.
*H04W 4/00* (2009.01)
(52) U.S. Cl. ........................................ 370/329
(58) Field of Classification Search ................ None
See application file for complete search history.

(56) References Cited

U.S. PATENT DOCUMENTS

| | | | | |
|---|---|---|---|---|
| 7,328,025 B2* | 2/2008 | Jechoux | | 455/452.1 |
| 2005/0286408 A1 | 12/2005 | Jin et al. | | |
| 2007/0133474 A1* | 6/2007 | Farkas et al. | | 370/335 |
| 2007/0242636 A1 | 10/2007 | Kashima et al. | | |
| 2007/0248149 A1* | 10/2007 | Shimomura et al. | | 375/146 |
| 2007/0280166 A1 | 12/2007 | Jung et al. | | |
| 2008/0013599 A1 | 1/2008 | Malladi | | |
| 2008/0084843 A1* | 4/2008 | Gorokhov et al. | | 370/330 |
| 2008/0310362 A1* | 12/2008 | McBeath et al. | | 370/330 |
| 2009/0245193 A1* | 10/2009 | Gaal et al. | | 370/329 |

FOREIGN PATENT DOCUMENTS

| KR | 1020050123041 A | 12/2005 |
|---|---|---|
| KR | 1020070110807 A | 11/2007 |

OTHER PUBLICATIONS

International Search Report dated Jun. 29, 2010 in connection with International Patent Application No. PCT/KR2009/006686.

* cited by examiner

*Primary Examiner* — Anh-Vu Ly

(57) ABSTRACT

A base station capable of communicating with a plurality of subscriber stations is configured to allocate a plurality of resource units to at least one subscriber station. The base station includes a controller configured to allocate a plurality of resource units from a two-dimensional logical matrix of resource units. The controller is configured to generate at least two indicator values, wherein the two indicator values are configured to identify the allocated resource units. The base station also includes a transmitter configured to transmit the two indicators to the subscriber station. The base station also is configured to construct the two-dimensional logical matrix that is adapted to enable contiguous and diverse resource unit allocations.

23 Claims, 12 Drawing Sheets

METHOD AND APPARATUS FOR RESOURCE ALLOCATION IN A COMMUNICATION SYSTEM

CROSS-REFERENCE TO RELATED APPLICATION(S) AND CLAIM OF PRIORITY

The present application is related to U.S. Provisional Patent No. 61/199,234, filed Nov. 14, 2008, entitled "METHODS AND APPARATUS FOR INDICATING RESOURCE ALLOCATIONS IN A COMMUNICATION SYSTEM", and U.S. Provisional Patent No. 61/199,346, filed Nov. 14, 2008, entitled "METHODS AND APPARATUS FOR RESOURCE ALLOCATION IN A COMMUNICATION SYSTEM". Provisional Patent Nos. 61/199,234 and 61/199,346 are assigned to the assignee of the present application and are hereby incorporated by reference into the present application as if fully set forth herein. The present application hereby claims priority under 35 U.S.C. §119(e) to U.S. Provisional Patent Nos. 61/199,234 and 61/199,346.

TECHNICAL FIELD OF THE INVENTION

The present application relates generally to wireless communication networks and, more specifically, to resource allocation in a wireless communications network.

BACKGROUND OF THE INVENTION

In a wireless communications network, resources such as frequency, time, and antennas can be allocated to transmit a packet. For example, in the downlink of an Orthogonal Frequency Division Multiple Access (OFDMA) based cellular system, the base station can transmit a packet to one or multiple mobile stations using a certain portion of the frequency bandwidth in a particular transmission time interval.

In different OFDMA based communication systems, a portion of the time-frequency resource is sometimes called a resource block (RB) or a virtual resource block (VRB), a resource unit (RU) or a logical resource unit (LRU), or a resource channel (RCH). Further, there are different types of time-frequency resources, such as distributed logical resource unit (distributed LRU) and localized logical resource unit (localized LRU) in IEEE 802.16m systems. Herein, the portion of the time-frequency resource is referred to as a resource unit (RU). Generally, multiple RUs exist in a system. These RUs can be allocated for transmitting data packets. The allocation of these RUs needs to be communicated via signaling messages or control channel messages. For example, in the downlink channel in an OFDM system, in addition to transmitting a data packet, the base station needs to communicate to the intended one or multiple mobile stations the information of the resources allocated to the transmission of the data packet so that the intended one or multiple mobile stations know in which RUs to receive the data packet.

Further, the transmission time can be one or multiple basic time units that may adopt different terms in different standards also, such as subframes or slots. Herein, the time used in a transmission is referred to as a transmission time interval (TTI).

SUMMARY OF THE INVENTION

A base station capable of communicating with a plurality of subscriber stations is provided. The base station is configured to allocate a plurality of resource units to at least one subscriber station. The base station includes a controller configured to allocate a plurality of resource units from a two-dimensional logical matrix of resource units. The controller is configured to generate at least two indicator values. The two indicator values are configured to identify the allocated resource units. The base station also includes a transmitter configured to transmit the two indicators to the subscriber station.

A base station capable of communicating with a plurality of subscriber stations in a wireless communications network is provided. The base station includes a controller and a transceiver. The controller is configured to allocate resource units through at least one message transmitted from the transceiver to at least one of the plurality of subscriber stations. Each resource unit includes a time-frequency slot. The controller further is configured to construct a two-dimensional logical matrix of resource elements. The logical matrix is adapted to enable both contiguous and diverse resource unit allocations.

A method of allocating resource units for use in a wireless network capable of communicating with a plurality of subscriber stations is provided. Each resource unit includes a time-frequency slot. The method includes allocating a plurality of resource units from a two-dimensional logical matrix of resource units. The method also includes generating at least two indicator values. The at least two indicator values are configured to identify the allocated resource units. The method further includes transmitting the at least two indicators to at least one of the plurality of subscriber stations.

A method of allocating resource units for use in a wireless network capable of communicating with a plurality of subscriber stations is provided. Each resource unit includes a time-frequency slot. The method includes collecting a plurality of the resource units of a frequency partition. The resource units are arranged into a logical matrix. The logical matrix is adapted to enable contiguous and diverse resource unit allocations. The method further includes allocating resources based on the resource matrix.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication network.

With regard to the following description, it is noted that the LTE term "node B" is another term for "base station" used below. Further, the term "cell" is a logic concept which can represent a "base station" or a "sector" belongs to a "base station". In this patent, "cell" and "base station" are used interchangeably to indicate the actual transmission units (may be "sector" or "base station" etc.) in the wireless system. Also, the LTE term "user equipment" or "UE" is another term for "subscriber station" used below.

Figure 1:
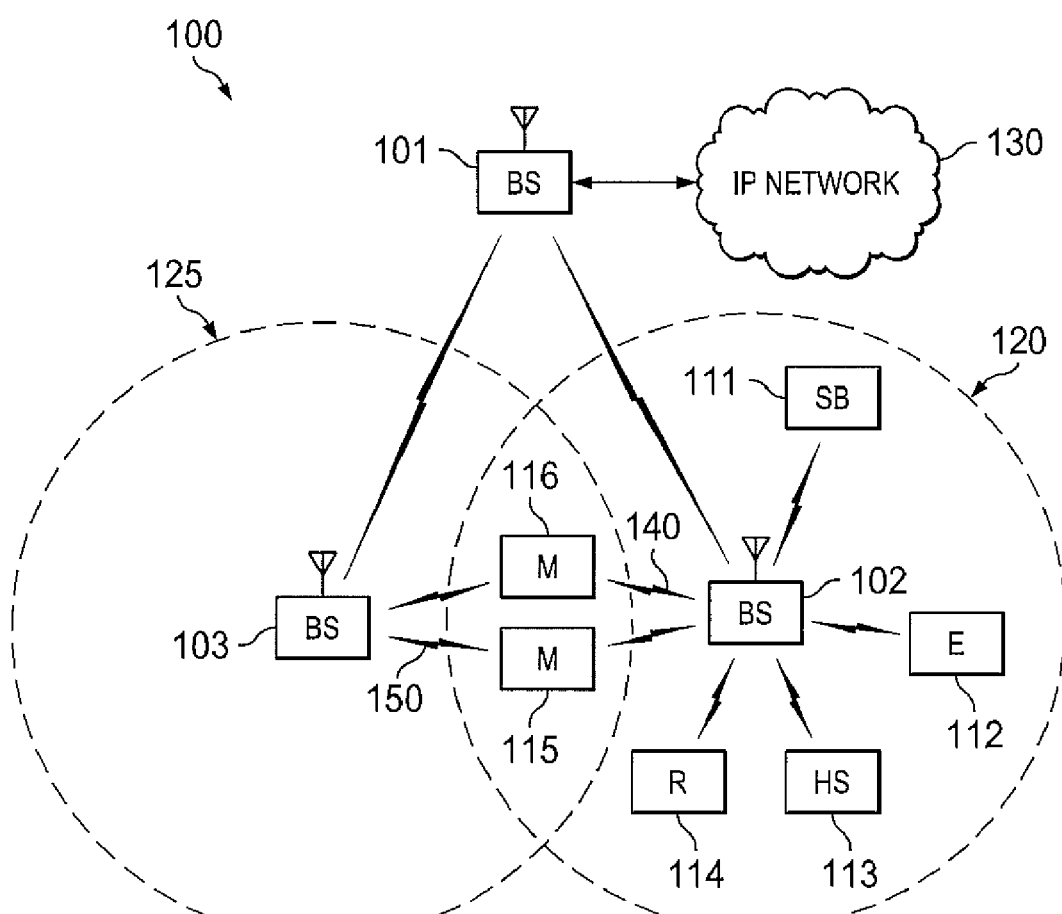
FIG. 1 illustrates exemplary wireless network 100 that is capable of decoding data streams according to embodiments of the present disclosure.

FIG. 1 illustrates exemplary wireless network 100 that is capable of decoding data streams according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. Subscriber station (SS) may be any wireless communication device, such as, but not limited to, a mobile phone, mobile PDA and any mobile station (MS). In an exemplary embodiment, SS 111 may be located in a small business (SB), SS 112 may be located in an enterprise (E), SS 113 may be located in a WiFi hotspot (HS), SS 114 may be located in a residence, SS 115 may be a mobile (M) device, and SS 116 may be a mobile (M) device.

Base station 103 provides wireless broadband access to network 130, via base station 101, to a second plurality of subscriber stations within coverage area 125 of base station 103. The second plurality of subscriber stations includes subscriber station 115 and subscriber station 116. In alternate embodiments, base stations 102 and 103 may be connected directly to the Internet by means of a wired broadband connection, such as an optical fiber, DSL, cable or T1/E1 line, rather than indirectly through base station 101.

In other embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be cell-edge devices interfering with each other. For example, the communications between BS 102 and SS 116 may be interfering with the communications between BS 103 and SS 115. Additionally, the communications between BS 103 and SS 115 may be interfering with the communications between BS 102 and SS 116.

In an exemplary embodiment, base stations 101-103 may communicate with each other and with subscriber stations 111-116 using an IEEE-802.16 wireless metropolitan area network standard, such as, for example, an IEEE-802.16e standard. In another embodiment, however, a different wireless protocol may be employed, such as, for example, a HIPERMAN wireless metropolitan area network standard. Base station 101 may communicate through direct line-of-sight or non-line-of-sight with base station 102 and base station 103, depending on the technology used for the wireless backhaul. Base station 102 and base station 103 may each communicate through non-line-of-sight with subscriber stations 111-116 using OFDM and/or OFDMA techniques.

Base station 102 may provide a T1 level service to subscriber station 112 associated with the enterprise and fractional T1 level service to subscriber station 111 associated with the small business. Base station 102 may provide wireless backhaul for subscriber station 113 associated with the WiFi hotspot, which may be located in an airport, café, hotel, or college campus. Base station 102 may provide digital subscriber line (DSL) level service to subscriber stations 114, 115 and 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber station 114 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. In the case of voice-based communications in the form of voice-over-IP (VoIP), the traffic may be forwarded directly to the Internet gateway instead of the PSTN gateway. The servers, Internet gateway, and public switched telephone network gateway are not shown in FIG. 1. In another embodiment, the connection to network 130 may be provided by different network nodes and equipment.

In accordance with an embodiment of the present disclosure, one or more of base stations 101-103 and/or one or more of subscriber stations 111-116 comprises a receiver that is operable to decode a plurality of data streams received as a combined data stream from a plurality of transmit antennas using an MMSE-SIC algorithm. As described in more detail below, the receiver is operable to determine a decoding order for the data streams based on a decoding prediction metric for each data stream that is calculated based on a strength-related characteristic of the data stream. Thus, in general, the receiver is able to decode the strongest data stream first, followed by the next strongest data stream, and so on. As a result, the decoding performance of the receiver is improved as compared to a receiver that decodes streams in a random or pre-determined order without being as complex as a receiver that searches all possible decoding orders to find the optimum order.

Figure 2A:
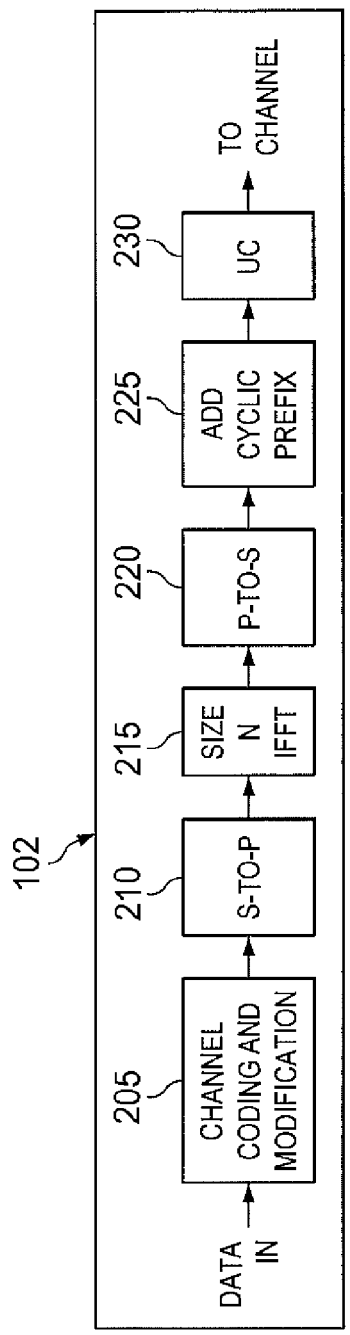
FIG. 2A illustrates a high-level diagram of an OFDMA transmitter according embodiments of the present disclosure.
Figure 2B:
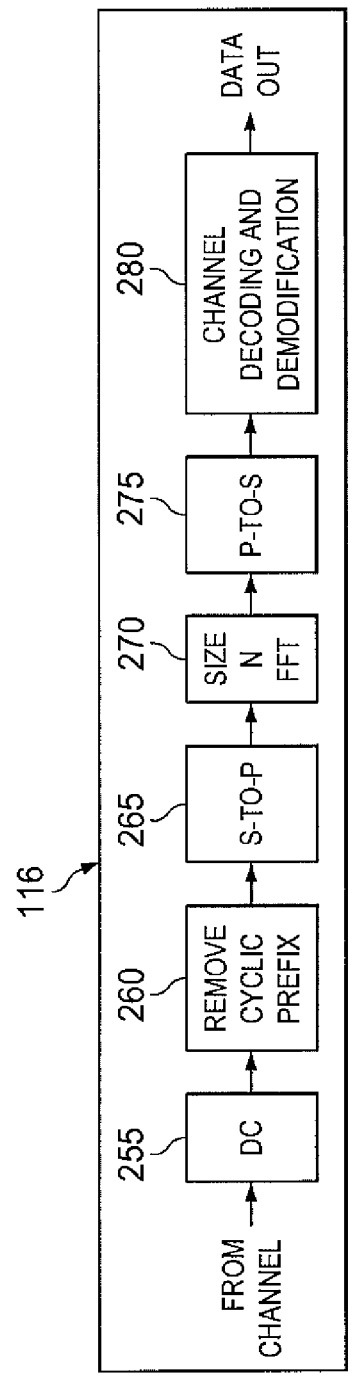
FIG. 2B illustrates a high-level diagram of an OFDMA receiver according embodiments of the present disclosure.

FIG. 2A illustrates a high-level diagram of an orthogonal frequency division multiple access (OFDMA) transmit path. FIG. 2B illustrates a high-level diagram of an orthogonal frequency division multiple access (OFDMA) receive path. In FIGS. 2A and 2B, the OFDMA transmit path is implemented in base station (BS) 102 and the OFDMA receive path is implemented in subscriber station (SS) 116 for the purposes of illustration and explanation only. However, it will be understood by those skilled in the art that the OFDMA receive path may also be implemented in BS 102 and the OFDMA transmit path may be implemented in SS 116.

The transmit path in BS 102 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. The receive path in SS 116 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, and so forth), while for FFT and IFFT functions, the value of the N variable may be any integer number that is a power of two (i.e., 1, 2, 4, 8, 16, and so forth).

In BS 102, channel coding and modulation block 205 receives a set of information bits, applies coding (such as Turbo coding) and modulates (such as QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

The present disclosure describes methods and systems to convey information relating to base station configuration to subscriber stations and, more specifically, to relaying base station antenna configuration to subscriber stations. This information can be conveyed through a plurality of methods, including placing antenna configuration into a quadrature-phase shift keying (QPSK) constellation (such as n-quadrature amplitude modulation (QAM) signal, wherein n is $2^x$) and placing antenna configuration into the error correction data (such as cyclic redundancy check (CRC) data). By encoding antenna information into either the QPSK constellation or the error correction data, the base stations 101-103 can convey base stations 101-103 antenna configuration without having to separately transmit antenna configuration. These systems and methods allow for the reduction of overhead while ensuring reliable communication between base stations 101-103 and a plurality of subscriber stations.

In some embodiments disclosed herein, data is transmitted using QAM. QAM is a modulation scheme which conveys data by modulating the amplitude of two carrier waves. These two waves are referred to as quadrature carriers, and are generally out of phase with each other by 90 degrees. QAM may be represented by a constellation that comprises $2^x$ points, where x is an integer greater than 1. In the embodiments discussed herein, the constellations discussed will be four point constellations (4-QAM). In a 4-QAM constellation a 2 dimensional graph is represented with one point in each quadrant of the 2 dimensional graph. However, it is explicitly understood that the innovations discussed herein may be used with any modulation scheme with any number of points in the constellation. It is further understood that with constellations with more than four points additional information (such as reference power signal) relating to the configuration of the base stations 101-103 may be conveyed consistent with the disclosed systems and methods.

It is understood that the transmitter within base stations 101-103 performs a plurality of functions prior to actually transmitting data. In the 4-QAM embodiment, QAM modulated symbols are serial-to-parallel converted and input to an inverse fast Fourier transform (IFFT). At the output of the IFFT, N time-domain samples are obtained. In the disclosed embodiments, N refers to the IFFT/fast Fourier transform (FFT) size used by the OFDM system. The signal after IFFT is parallel-to-serial converted and a cyclic prefix (CP) is added to the signal sequence. The resulting sequence of samples is referred to as an OFDM symbol.

At the receiver within the subscriber station, this process is reversed, and the cyclic prefix is first removed. Then the signal is serial-to-parallel converted before being fed into the FFT. The output of the FFT is parallel-to-serial converted, and the resulting QAM modulation symbols are input to the QAM demodulator.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

Figure 3:
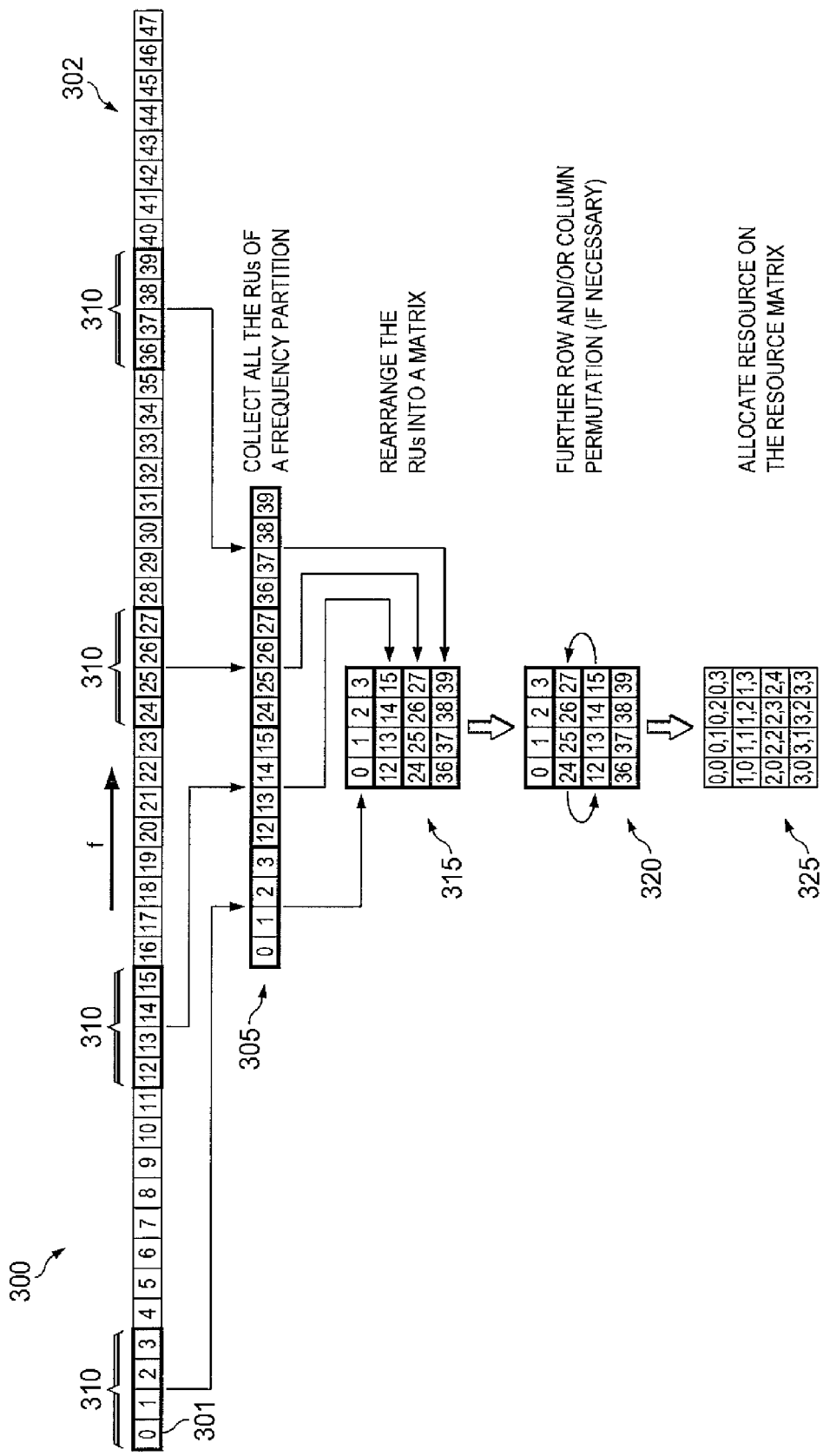
FIG. 3 illustrates shows a construction of a resource matrix according to embodiments of this disclosure.

FIG. 3 illustrates shows a construction of a resource matrix according to embodiments of this disclosure. The embodiment of the resource matrix construction 300 shown in FIG. 3 is for illustration only. Other embodiments could be used without departing from the scope of this disclosure.

In an OFDMA system, the available RUs 301 are partitioned into one or multiple frequency partitions 305. Each frequency partition includes one or multiple RUs 301. For example, a frequency partition can include all RUs 301 in the system. In additional examples, a frequency partition only consists of a portion of the RUs 301 in the system, as shown in the frequency partition illustrated in FIG. 3. The usage pattern of different frequency partitions can be different in the entire network, thus enabling flexible frequency reuse (FFR).

A one-dimensional allocation 302 includes a number of RU's 301. For example, one-dimensional allocation 302 can include at least one of the forty-eight RU's 301, labeled from '0' to '47', as shown in FIG. 3. Each RU 301 can be configured in two dimensions such that each RU 301 includes eighteen sub-carriers along a frequency axis and six OFDM symbols along a time axis. For illustration purposes, in this example, the subcarriers and OFDM symbols within each RU are contiguous. However, RUs with distributed subcarriers could be used without departing from the scope of this invention. Each RU block 310 represents a group of contiguous RU's 301. Additionally, the RU's 301 can be distributed diversely across the system in the frequency ("f") axis.

The base station includes a controller and transmitter configured to construct a two-dimensional logical matrix 315 for resource allocation. The controller can construct the resource matrix 315 using the resource matrix construction method 300. The two-dimensional logical resource matrix 315 is constructed to enable contiguous (also referred to as selective) allocations, diversity allocations, and a combination of selective and diversity allocations.

In one embodiment, the resource matrix construction 300 method includes the following steps. All the RUs 301 of a frequency partition are collected. The RUs 301 are rearranged into a matrix 315. The resources on the resource matrix 325 are allocated for transmission of packets. The dimension of the resource matrix 315 can be chosen according to the frequency partition. However, other choices of the dimension of the resource matrix 315 could be used without departing from the scope of this disclosure.

For example, as shown in FIG. 3, the illustrated frequency partition 305 includes four blocks 310. Each of the four blocks 310 includes four contiguous RUs 301. In this example, a 4×4 resource matrix 315 can be constructed with each row corresponding to an RU block 310. By doing so, an allocation within a row corresponds to contiguous RUs 301. Similarly, an allocation across multiple rows corresponds to noncontiguous (for example, diverse or distributed) RUs 301. These two kinds of allocations match well with a need for localized resource allocation and distributed resource allocation. For example, as will be illustrated further herein below with respect to FIGS. 4-8, the resource matrix 315 is constructed such that a number of allocations can be performed to provide contiguous blocks, diversity blocks, and a combination of contiguous and diverse blocks.

In some embodiments, once the RUs 301 are rearranged into a resource matrix 315, further processing of the resource matrix 315 is performed. As illustrated in FIG. 3, further row permutation and/or column permutation 320 can be applied to the resource matrix 315. For example, a row permutation 320 will further separate the RUs 301 in frequency for a column-wise resource allocation. The row permutation 320 can increase the frequency diversity of resource allocation with RUs 301 in adjacent rows. Thereafter, the allocation process or device, such as the base station controller, can allocate the resources on a permutated resource matrix.

The resource matrix construction 300 can be common for all cells in a cellular network 100. In this case, other-cell interference variation is large and system capacity can improve if communication nodes can adapt the transmission or reception based on the interference variation.

Additionally, the resource matrix construction 300 can be cell-specific. In this case, other-cell interference is randomized, thus reducing the other-cell interference variation perceived by a resource allocation. This can be beneficial for transmissions that prefer a stable interference, such as transmissions for delay-sensitive applications. One method of having cell-specific resource matrix construction 300 is to apply row permutation and/or column permutation 320 with cell-specific permutation sequences.

Figure 4:
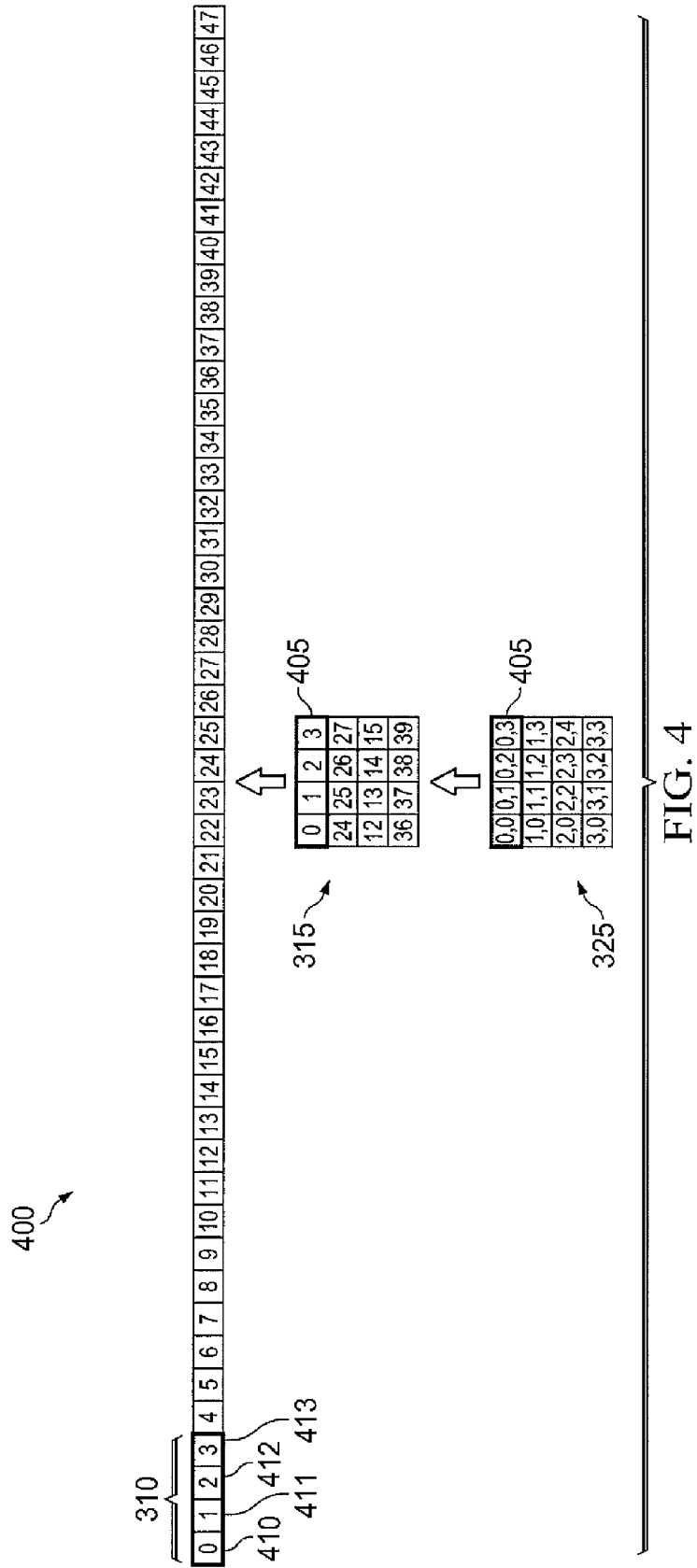
FIG. 4 illustrates a row-wise allocation on a resource matrix according to embodiments of the present disclosure.

FIG. 4 illustrates a row-wise allocation on a resource matrix 315 according to embodiments of the present disclosure. The embodiment of the row-wise allocation 400 shown in FIG. 4 is for illustration only. Other embodiments could be used without departing from the scope of this disclosure.

The resources on the resource matrix 325 are allocated for transmission of packets. In some embodiments, the first row 405 is allocated to a transmission. For example, based on the resource matrix construction 300, the first row 405 in the resource matrix corresponds to a block 310 of four contiguous RUs 301, such as RU_0 410, RU_1 411, RU_2 412, and RU_3 413. Although illustrated in the example in FIG. 4, it is not necessary to assign a whole row to a transmission. For example, the resource allocation process or device, such as a base station controller, may only assign RU_1 411 and RU_2 412 to a transmission.

When the base station selects the first row 405 of the resource matrix 315 for allocation, the base station allocates a contiguous RU block 310. Accordingly, when using a row-wise allocation 400, the base station can allocate a contiguous block of RU's 301 to one or more subscriber stations.

Figure 5:
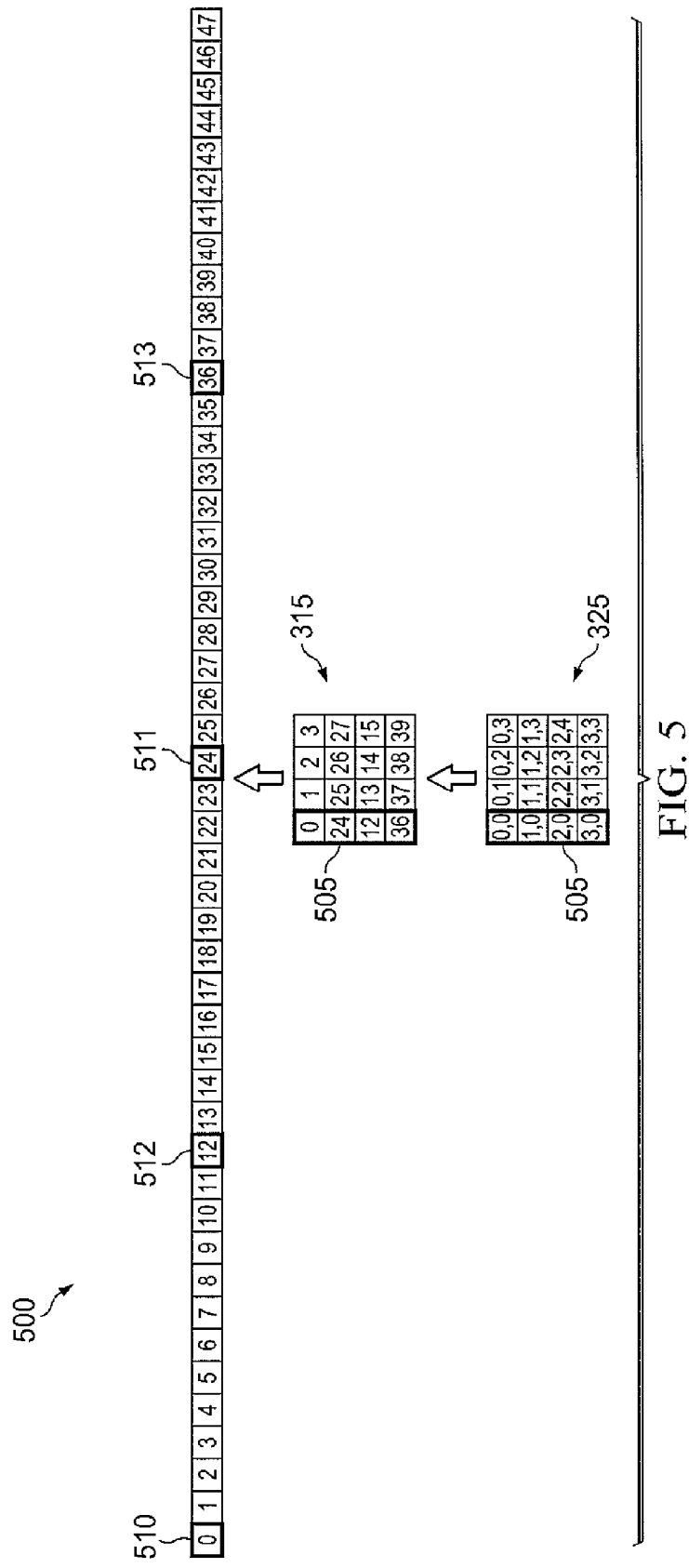
FIG. 5 illustrates a column-wise allocation on a resource matrix according to embodiments of the present disclosure.

FIG. 5 illustrates column-wise allocation on a resource matrix according to embodiments of the present disclosure. The embodiment of the column-wise allocation 500 shown in FIG. 5 is for illustration only. Other embodiments could be used without departing from the scope of this disclosure.

The resources on the resource matrix 325 are allocated for transmission of packets. The first column 505 is allocated to a transmission. Based on the resource matrix construction 300, the first column 505 in the resource matrix 315 corresponds to four distributed RUs 301, such as RU_0 510, RU_24 511, RU_12 512, and RU_36 513. Although illustrated in the example in FIG. 5, it is not necessary to assign an entire column to a transmission. For example, the resource allocation process or device may only assign RU_24 511 and RU_12 512 to a transmission.

When the base station selects the first column 505 of the resource matrix 315 for allocation, the base station allocates non-contiguous, or diverse, RUs 301. Accordingly, when using a column-wise allocation 400, the base station can allocate distributed RU's 301 to one or more subscriber stations.

In an OFDMA system 100, each RU 301 can include a number of contiguous frequency sub-carriers across a number of contiguous OFDM symbols. For example, each RU 301 can include eighteen contiguous frequency sub-carriers across six contiguous OFDM symbols. Further channelization can be applied on the resources allocated for distributed resource allocation (discussed in further detail with respect to FIG. 16). For example, on the first column 505, including RU_0 510, RU_24 511, RU_12 512, and RU_36 513, sub-carrier based distributed resources can be constructed by applying sub-carrier permutation to the four distributed RUs, RU_0 510, RU_24 511, RU_12 512, and RU_36 513. Further, a few sub-carriers on the four distributed RUs can be selected to form sub-carrier based distributed resources. Additionally, for illustration purpose, in this example, the subcarriers and OFDM symbols within each RU are contiguous. However, RUs with distributed subcarriers could be used without departing from the scope of this invention.

Figure 6:
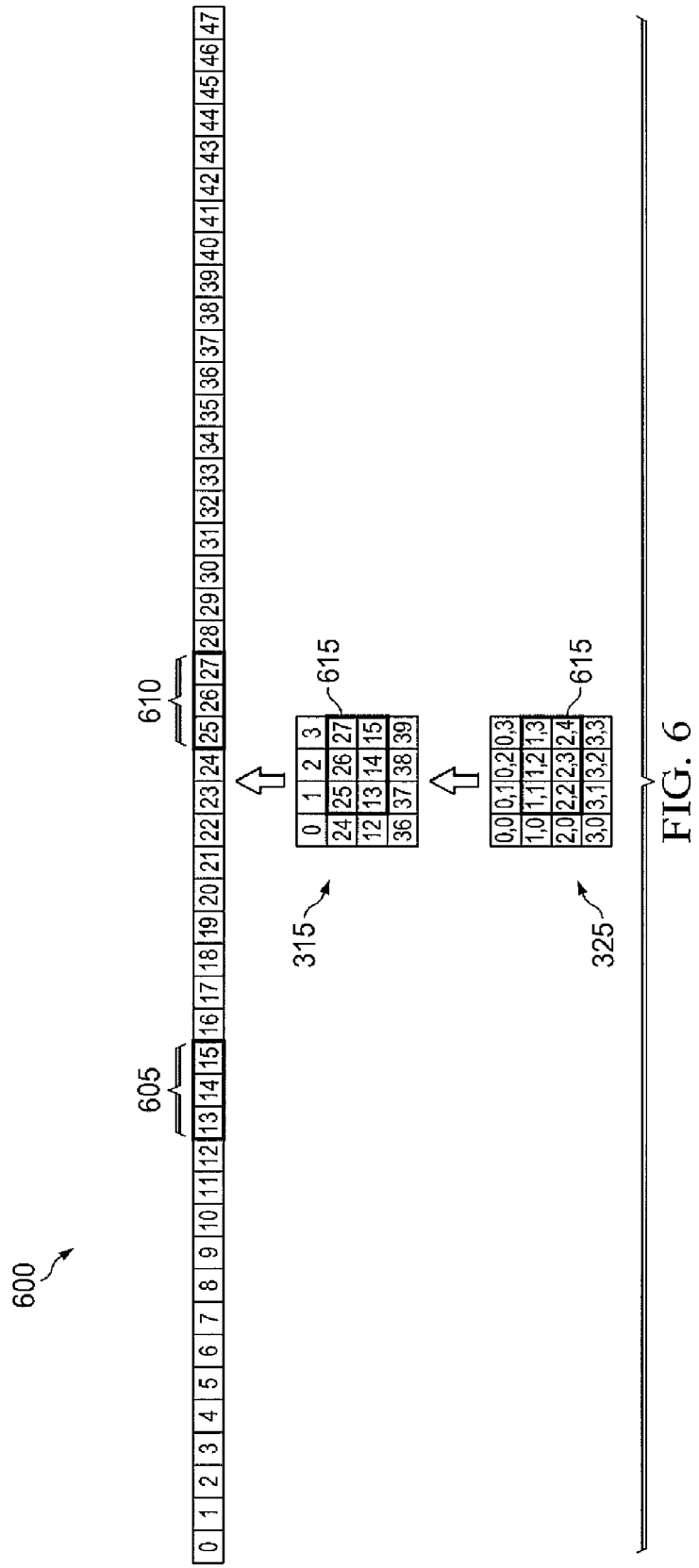
FIG. 6 illustrates a sub-matrix allocation on a resource matrix according to embodiments of the present disclosure.

FIG. 6 illustrates sub-matrix allocation on a resource matrix 315 according to embodiments of the present disclosure. The embodiment of the sub-matrix allocation 600 shown in FIG. 6 is for illustration only. Other embodiments could be used without departing from the scope of this disclosure.

The resources on the resource matrix 325 are allocated for transmission of packets. In the example illustrated in FIG. 6, a first contiguous block 605 of RU's including RU_25, RU_26, and RU_27, and a second contiguous block 610 of RU's including RU_13, RU_14, and RU_15 615 are allocated to a transmission. The sub-matrix allocation 615 can span multiple rows and columns. As a result, the resource allocation includes multiple distributed blocks 605, 610 with each block comprising of multiple contiguous RUs 301. As shown in FIG. 6, RU_13, RU_14, and RU_15 form the first contiguous block 605. RU_25, RU_26, and RU_27 form the second contiguous block 610. However, the first contiguous block 605 and the second contiguous block 610 are distributed in frequency. Although the resource allocation includes both contiguous and distributed RU's, this resource allocation can be referred to as being more selective based than diverse.

Figure 7:
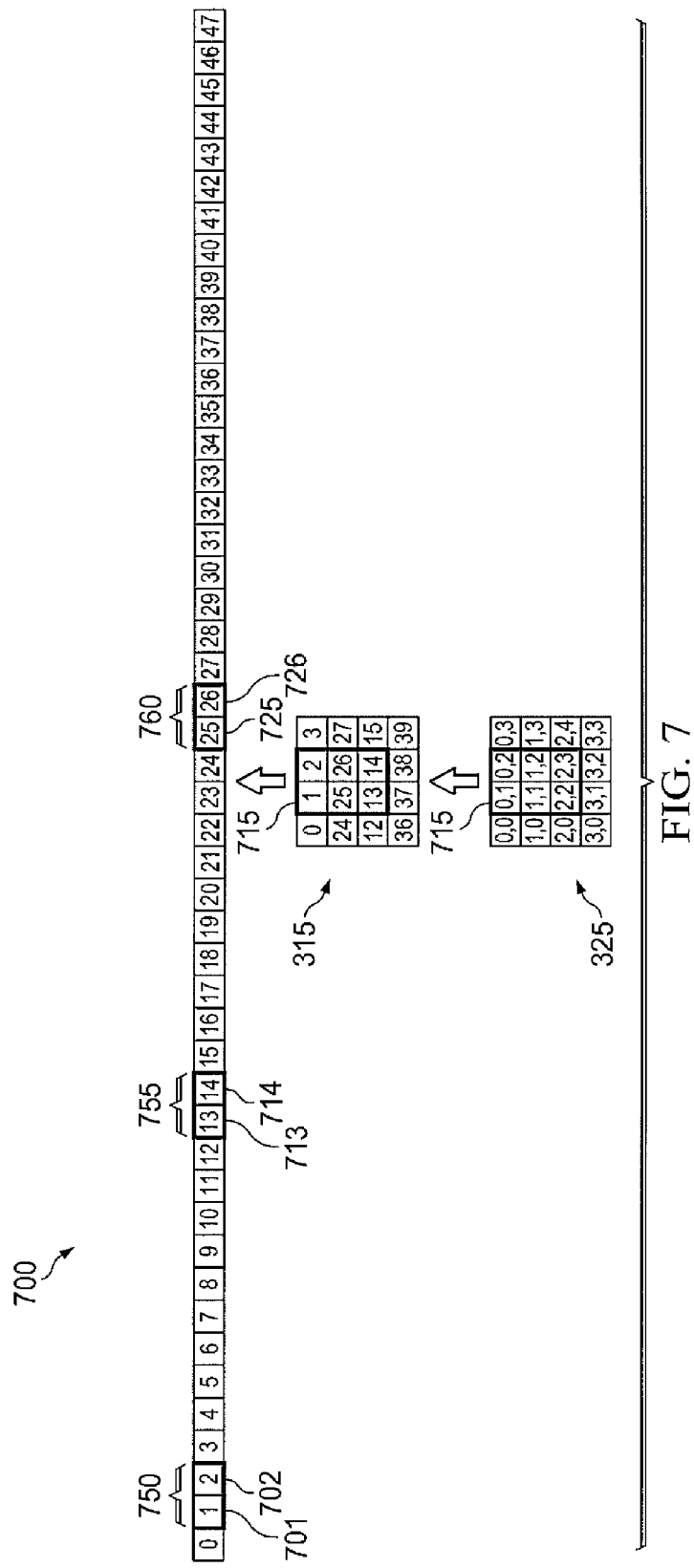
FIG. 7 illustrates another sub-matrix allocation on a resource matrix according to embodiments of the present disclosure.

FIG. 7 illustrates another sub-matrix allocation on a resource matrix 315 according to embodiments of the present disclosure. The embodiment of the sub-matrix allocation 700 shown in FIG. 7 is for illustration only. Other embodiments could be used without departing from the scope of this disclosure.

The resources on the resource matrix 325 are allocated for transmission of packets. In the example shown in FIG. 7, RU_1 701, RU_2 702, RU_13 713, RU_14 714, RU_25 725, and RU_26 726, are allocated to a transmission. The sub-matrix allocation 715 spans multiple rows and columns. As a result, this resource allocation 715 comprises of multiple distributed blocks 750, 755, 760 with each block comprising of multiple contiguous RUs. As shown in FIG. 7, RU_1 701 and RU_2 702 form a first contiguous block 750. RU_13 713 and RU_14 714 form a second contiguous block 755. RU_25 725 and RU_26 726 form a third contiguous block 760. However, the first contiguous block 750, the second contiguous block 755, and third contiguous block 760 are distributed in frequency. Although the resource allocation includes both contiguous and distributed RU's, this resource allocation can be referred to as including more diversity than selectivity.

Figure 8A:
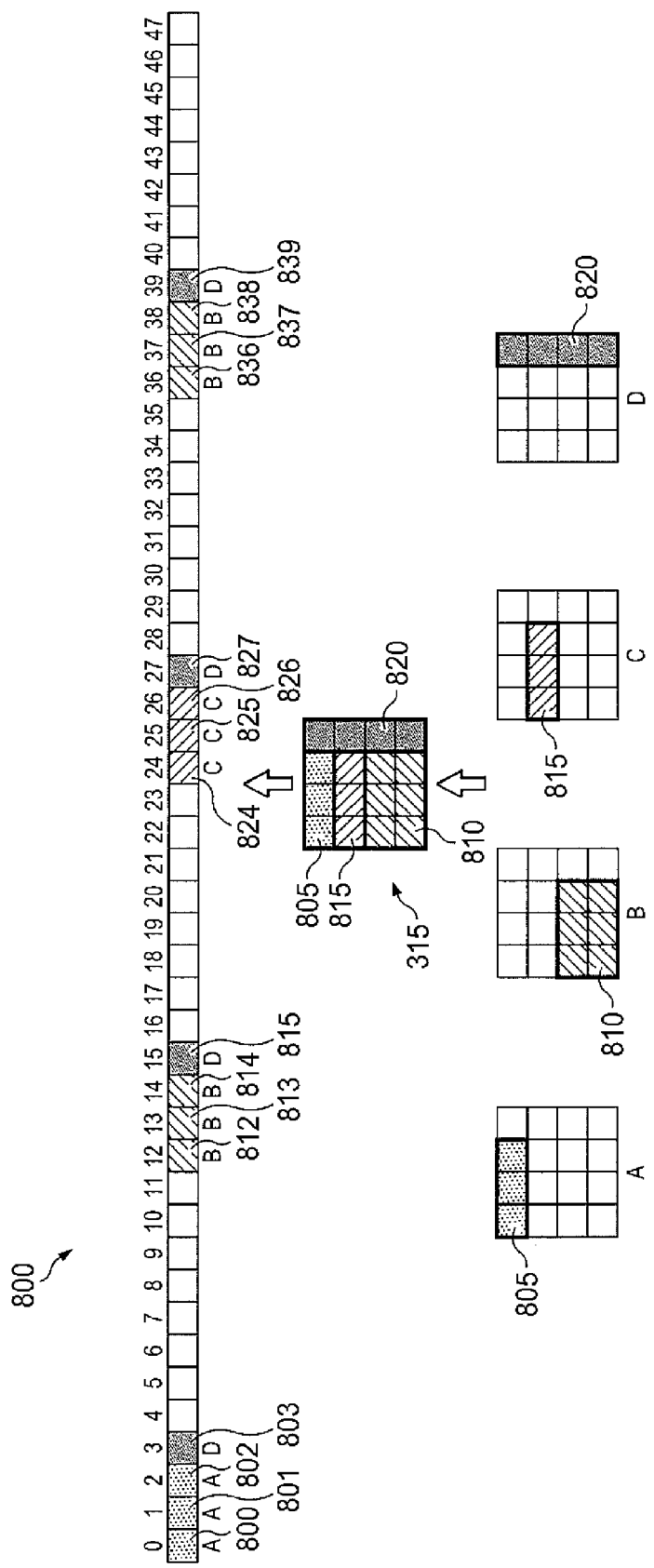
FIG. 8A illustrates a multiple resource allocation according to embodiments of the present disclosure.

FIG. 8A illustrates multiple resource allocation according to embodiments of the present disclosure. The embodiment of the multiple resource allocation 800 shown in FIG. 8A is for illustration only. Other embodiments could be used without departing from the scope of this disclosure.

In the example illustrated in FIG. 8, resource allocations are performed using row-wise, column-wise and sub-matrix allocations. By using row-wise, column-wise, and sub-matrix allocations together, the RUs 301 can be efficiently assigned to transmissions that require localized or distributed resources. Multiple resource allocation 800 can enable all RUs in a frequency partition to be utilized.

For example, each of the RU's in RU block 805, 810, 815, 820 are allocated. The RU's from the A block 805 are allocated to RU_0 800, RU_1 801, and RU_2 802. The RU's from the B block 810 are allocated to RU_12 812, RU_813, RU_14 814, RU_36 836, RU_37 837 and RU_38 838. The RU's from the C block 815 are allocated to RU_24 824, RU_25 825, and RU_26 826. Additionally, the RU's from the D block 820 are allocated to RU_3 803, RU_15 815, RU_27 827 and RU_39 839. Accordingly, the base station allocates a portion of the RU's as contiguous blocks (as illustrated by the A block 805 and C block 815), a portion of RU's as distributed (as illustrated by the D block 820), a portion that is both contiguous and diverse (as illustrated by the B block 810).

Figure 8B:
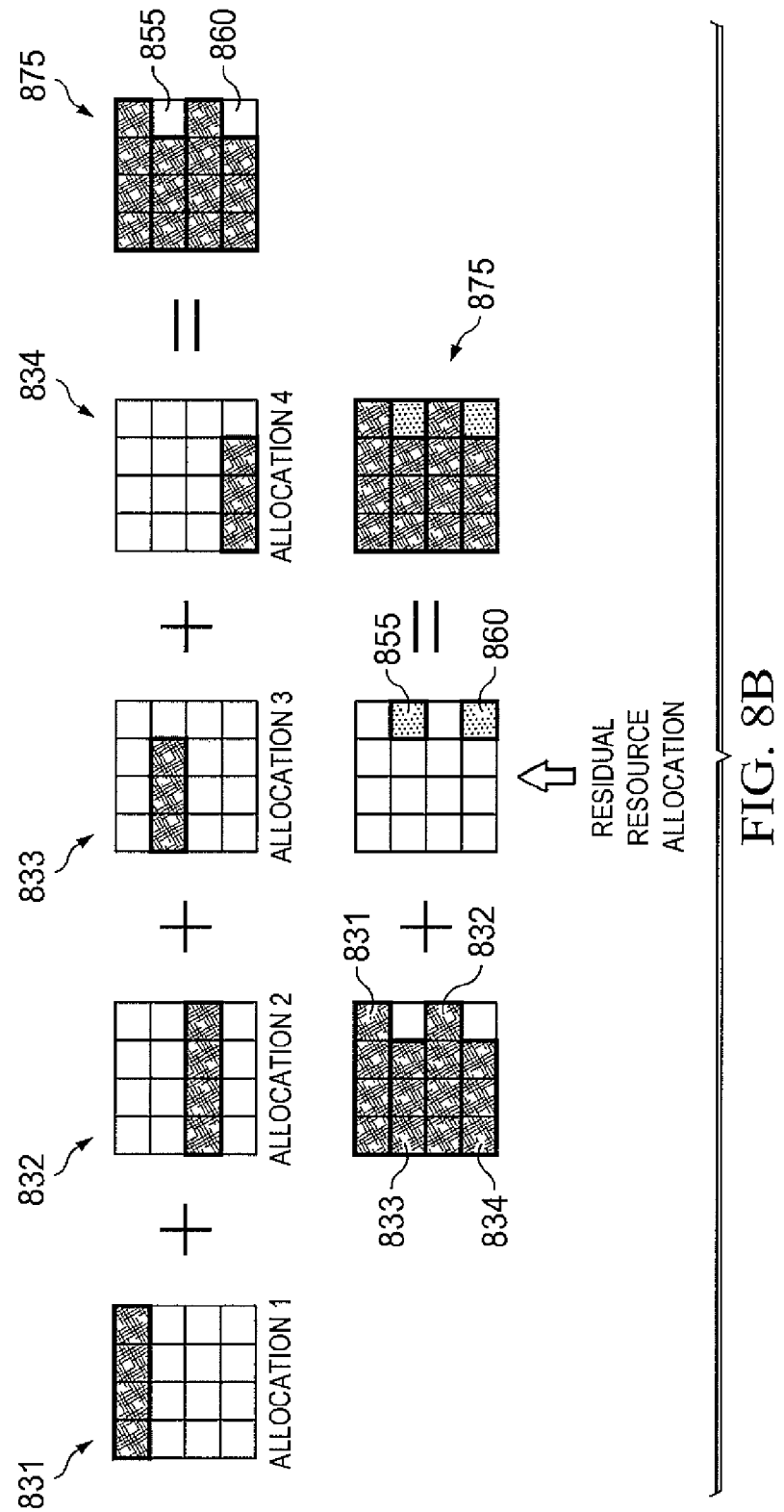
FIG. 8B illustrates a residual resource allocation according to embodiments of the present disclosure.

FIG. 8B illustrates a residual resource allocation according to embodiments of the present disclosure. The embodiment of the residual resource allocation 880 shown in FIG. 8B is for illustration only. Other embodiments could be used without departing from the scope of this disclosure.

In the embodiment illustrated in FIG. 8A, the row-wise, column-wise, and sub-matrix allocations all allocate a block 805, 810, 815 and 820 of RUs that are contiguous on the resource matrix 875, although these RUs may not be contiguous in frequency. Contiguous allocation on the resource matrix 875 results in less signaling or control channel overhead with a limitation on resource allocation flexibility. However, lack of data in transmission buffer, early termination of HARQ session, and frequency selective scheduling may result in fragmentation of resources, i.e., RUs that are non-contiguous on the resource matrix 315. In order to further improve the efficiency of resource allocation and maximize utilization of resources, residual (or noncontiguous) resource allocation can be used. One example is shown in FIG. 8B, the resource allocation_1 831, allocation_2 832, allocation_3 833, and allocation 4 834 result in two resource units 855, 860 that are non-contiguous on the resource matrix 870. A residual allocation 875 can allocate these two RUs 855, 860 to a transmission although these two RUs 855, 860 are non-contiguous on the resource matrix 875.

Figure 9:
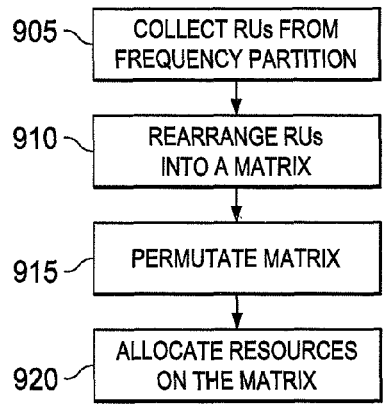
FIG. 9 illustrates a process of allocating resources according to embodiments of the present disclosure.

FIG. 9 illustrates a process of allocating resources according to embodiments of the present disclosure. The embodiment of the process 900 shown in FIG. 9 is for illustration only. Other embodiments could be used without departing from the scope of this disclosure.

In an OFDMA system, the available RUs are partitioned into one or multiple frequency partitions. Each frequency partition includes one or multiple RUs. For example, a frequency partition can include all RUs in the system. In additional examples, a frequency partition only consists of a portion of the RUs in the system. The usage pattern of different frequency partitions can be different in the entire network, thus enabling FFR.

In block 905, all the RUs of a frequency partition are collected. The RUs are rearranged into a matrix in block 910. The dimension of the resource matrix can be chosen according to the frequency partition. However, other choices of the dimension of the resource matrix could be used without departing from the scope of this disclosure. In some embodiments, once the RUs are rearranged into a resource matrix, further row permutation and/or column permutation can be applied to the resource matrix in block 920. For example, a row permutation will further separate the RUs in frequency for a column-wise resource allocation. The row permutation can increase the frequency diversity of resource allocation with RUs in adjacent rows. Thereafter, the allocation process or device, such as the base station controller, can allocate the resources on a permutated resource matrix. In block 920, the resources on the resource matrix are allocated for transmission of packets.

As an extension of the resource allocation schemes described in this disclosure, multiple row-wise, column-wise, and sub-matrix allocations can be assigned to one transmission. This extension can be viewed as a combination of residual allocation with the row-wise, column-wise and sub-matrix allocations. This extension improves the flexibility of resource allocation with increased signaling and control channel overhead.

Although the embodiments described hereinabove illustrate a two-dimensional resource matrix, the concepts disclosed herein are equally applicable to matrices with higher dimensions. For example, a third dimension can be added to the resource matrix to accommodate resource allocation in a multiple-input multiple-output (MIMO) system. In that case, the third dimension represents the spatial dimension, which can be antennas, virtual antennas, spatial layers, spatial streams, or MIMO codewords.

Figure 10:
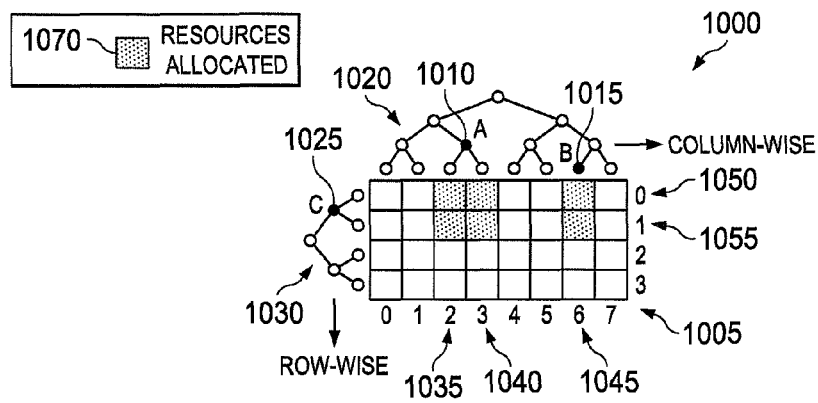
FIG. 10 illustrates a resource allocation using resource trees according to embodiments of the present disclosure.

FIG. 10 illustrates a resource allocation using resource trees according to embodiments of the present disclosure. The embodiment of the resource allocation 1000 shown in FIG. 10 is for illustration only. Other embodiments could be used without departing from the scope of this disclosure.

A tree structure can be used for resource allocation due to its simple structure and low signaling overhead. In one embodiment, a first resource tree is constructed along a first dimension of a resource matrix and a second resource tree is constructed along a second dimension of the resource matrix 1005. Resources can be allocated by indicating a first node on the first resource tree and a second node on the second resource tree. The indication of the first node on the first resource tree and the indication of the second node on the second resource tree can be encoded separately into two message fields or jointly encoded into one message field. As a straightforward extension of the idea, a plurality of nodes can be assigned in each dimension.

For example, as shown in FIG. 10, two nodes 1010, 1015 in the first tree 1020 are assigned column-wise—node A 1010 and node B 1015—with node A 1010 representing column_2 1035 and column_3 1040 and node B 1015 representing column_6 1045. One node is assigned row-wise—node C 1025 in the second tree 1030-representing row_1 1050 and row_2 1055. As such, the resource units that are located at the intersection of columns {2, 3, 6}, and rows {0, 1} are assigned, which are shown as a shaded grid. In the example illustrated in FIG. 10, the shaded grids 1070 represent the resources allocated.

Figure 11:
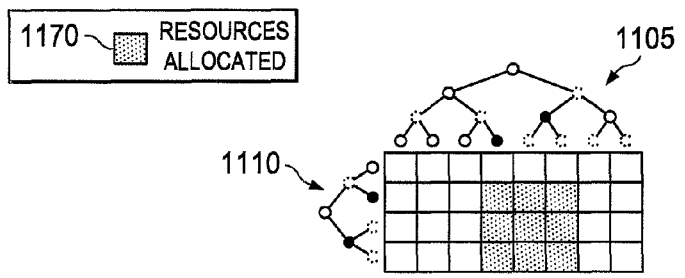
FIG. 11 illustrates signal compression applied to allocations using resource trees according to embodiments of the present disclosure.

FIG. 11 illustrates signal compression applied to allocations using resource trees according to embodiments of the present disclosure. The embodiment of the signal compression shown in FIG. 11 is for illustration only. Other embodiments could be used without departing from the scope of this disclosure.

In some embodiments, the signaling overhead can be further reduced by signaling only a portion of the nodes on the tree such that only a portion of the nodes in the resource tree are supported. To disable or reduce the number of nodes supported, further signaling compression is applied to the signaling of tree nodes allocation. For example, there are fifteen nodes in the column-wise resource tree 1105. Four (4)-bits would be needed to signal a node if all nodes are supported in signaling. However, if only eight (8) of the fifteen (15) nodes in the column-wise resource tree 1105 are supported, then three (3) bits are needed to signal a node in the column-wise allocation. In the example illustrated in FIG. 11, the dashed circles 1115 represent the nodes not supported by signaling; the non-dashed circles 1120 represent the supported by signaling but not allocated nodes; and the solid circles 1125 represent the nodes supported by signaling and allocated. Further, the shaded grids 1170 represent the resources allocated. Likewise, four (4) out of the seven (7) nodes in the row-wise resource tree 1110 are supported, which means two (2) bits are needed to signal a node in the row-wise allocation. With this compression, the resource allocation shown as the shaded grids 1170 in FIG. 11 only requires ten (10) bits (two column-wise nodes and two row-wise nodes) at most, and further compression is possible.

Figure 12:
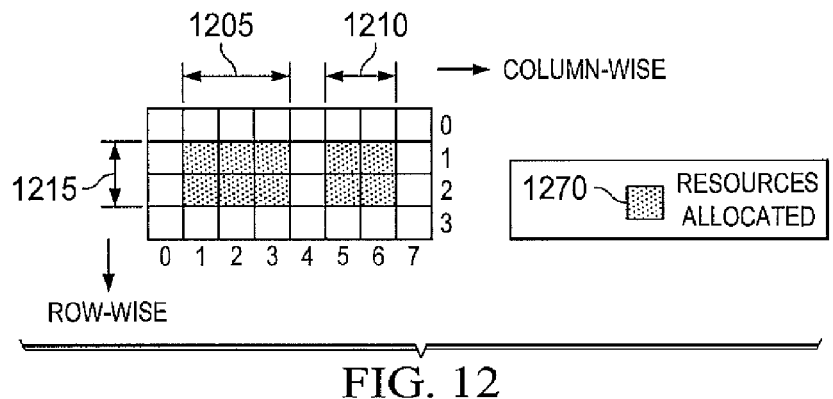
FIG. 12 illustrates segment allocation according to embodiments of the present disclosure.

FIG. 12 illustrates segment allocation according to embodiments of the present disclosure. The embodiment of the segment allocation shown in FIG. 12 is for illustration only. Other embodiments could be used without departing from the scope of this disclosure.

In some embodiments, the resource units in a resource matrix can be allocated by allocating a first contiguous segment in a first dimension of the resource matrix and a second contiguous segment in a second dimension of the resource matrix. Accordingly, a plurality of columns can be indicated for, selectivity and a plurality of rows can be indicated for diversity in order to provide an allocation that includes both selectivity and diversity. A straightforward extension is to allocate a plurality of contiguous blocks in a dimension. For example, two contiguous segments 1205, 1210 are allocated column-wise, with one segment 1205 representing columns 1-3 and another segment 1210 representing columns 5-6. One contiguous segment 1215 is allocated row-wise, representing row 1-2. As such, the resource units 1270 at the intersection of columns {1, 2, 3, 5, 6} and rows {1, 2} are allocated (in the example illustrated in FIG. 12, the shaded grids represent the resources allocated 1270).

Figure 13:
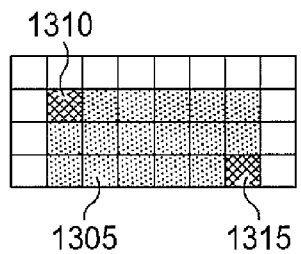
FIG. 13 illustrates block allocation according to embodiments of the present disclosure.

FIG. 13 illustrates block allocation according to embodiments of the present disclosure. The embodiment of the block allocation shown in FIG. 13 is for illustration only. Other embodiments could be used without departing from the scope of this disclosure.

In some embodiments, a contiguous block 1305 of resource units can be allocated by indicating two corners of the block (in the example illustrated in FIG. 13, the shaded grids represent the resources allocated in the contiguous block 1305). The allocated block 1305 is signaled by indicating the top-left corner resource unit 1310 and the bottom-right corner resource unit 1315. The signaling for the indication of top-left corner resource unit 1310 and the signaling of the indication of the bottom-right corner resource unit 1315 can be encoded separately into two message fields or jointly encoded into one message field.

Figure 14:
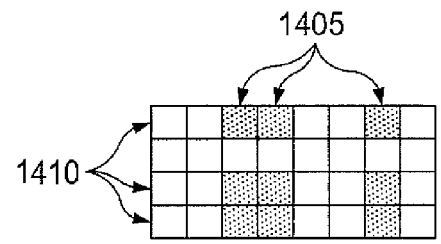
FIG. 14 illustrates best-M allocation according to embodiments of the present disclosure.

FIG. 14 illustrates best-M allocation according to embodiments of the present disclosure. The embodiment of the best-M allocation shown in FIG. 14 is for illustration only. Other embodiments could be used without departing from the scope of this disclosure.

In some embodiments, a first plurality of columns 1405 and a second plurality of rows 1410 are indicated in a resource allocation message such that the resource units at the intersection of the first plurality of columns 1405 and the second plurality of rows 1410 are allocated for a transmission. The selected plurality of rows (or columns) can correspond to the resource units that have a favorable channel condition such that the communication can be more reliable and support higher data rate. This scheme also is referred to as best-M scheme. The best-M scheme is further discussed in Thomas M. Cover, "Enumerative Source Encoding", IEEE Transactions on Information Theory, Vol. IT-19, No. 1, January 1973, page 73-77, the contents of which hereby are incorporated by reference in their entirety. In the example shown in FIG. 14, the best-3 columns 1405 and the best-3 rows 1410 are selected.

Figure 15:
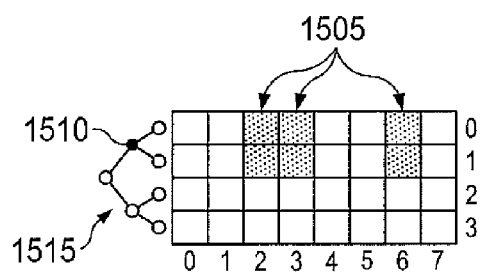
FIG. 15 illustrates a column-wise best-M and row-wise tree allocation according to embodiments of the present disclosure.

FIG. 15 illustrates a column-wise best-M and row-wise tree allocation according to embodiments of the present disclosure. The embodiment of the allocation shown in FIG. 15 is for illustration only. Other embodiments could be used without departing from the scope of this disclosure.

In some embodiments, a first resource allocation scheme is used in a first dimension of a resource matrix and a second resource allocation scheme is used in a second dimension of the said resource matrix. The resource allocation scheme can be, but is not limited to, a tree allocation, a segment allocation, a block allocation, or a best-M allocation. For example, a Best-M can be used in column-wise allocation and resource tree is used in row-wise allocation. Three columns 1505 are selected by the column-wise best-M allocation. One node 1510 is selected by the row-wise resource tree 1515 allocation. As such, the resource units at the intersection of columns {2, 3, 6} and rows {0, 1} are allocated.

Figure 16:
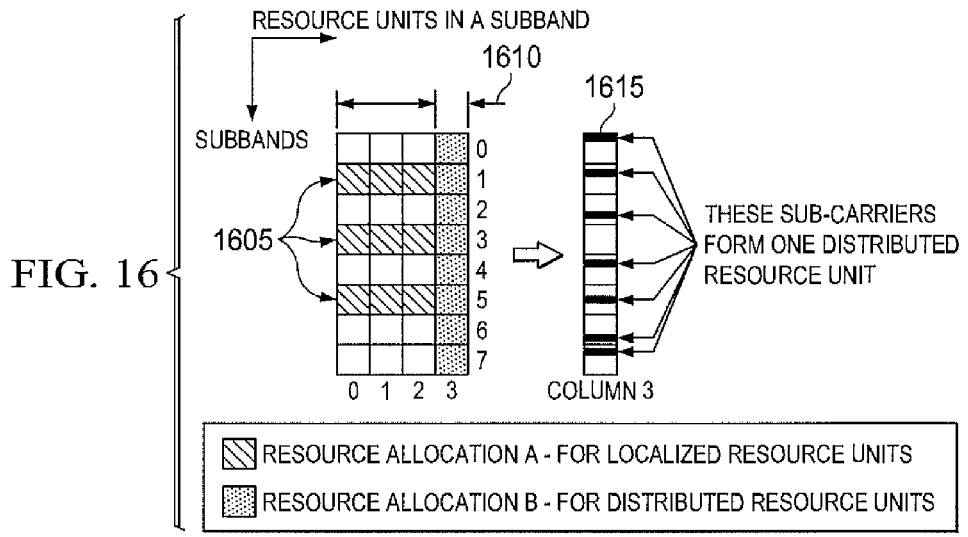
FIG. 16 illustrates a channelization for resource allocation on a resource matrix according to embodiments of the present disclosure.

FIG. 16 illustrates a channelization for resource allocation on a resource matrix according to embodiments of the present disclosure. The embodiment of the channelization shown in FIG. 16 is for illustration only. Other embodiments could be used without departing from the scope of this disclosure.

In some embodiments, within the allocation further channelization can be applied to resources allocated on a resource matrix. For example, further channelization can be applied to further increase diversity. Any one of a combination of the aforementioned methods can be used to allocate resources on a resource matrix. In order to obtain diversity, multiple resource units may need to be allocated; channelization is performed to enable a diversity transmission using only one resource unit. As such, after allocation, in which a plurality of resource units is allocated, channelization is performed on the allocated resource units. Sub-carriers are taken from each of the allocated resource units and grouped into one distributed resource unit. Therefore, only a portion of the distributed resource units are used, through channelization, to create another set of distributed resource units wherein only one allocated unit.

For example, the resource allocated can be further channelized as shown in FIG. 16. Each row represents a frequency sub-band that includes four (4) contiguous resource units. Resource allocation A allocates the resource units at the intersection of columns {0, 1, 2} and rows {1, 3, 5} to a transmission. This allows the scheduler to choose the best three (3) sub-bands 1605 (rows {1, 3, 5} for this particular transmission) and allocates three (3) resource units in each sub-band. Resource allocation B allocated all the resource units in column 3 1610 for distributed resource units. Distributed resource units are constructed on all the resource units in column 3 1610. An additional example is shown in column_3 1615 in the right hand side of FIG. 16. The sub-carriers in the resource units in column_3 1615 are further distributed to a plurality of distributed resource units. By distributing the sub-carriers, each distributed resource unit can obtain higher frequency diversity than localized resource unit in which all sub-carriers are contiguous.

Figure 17:
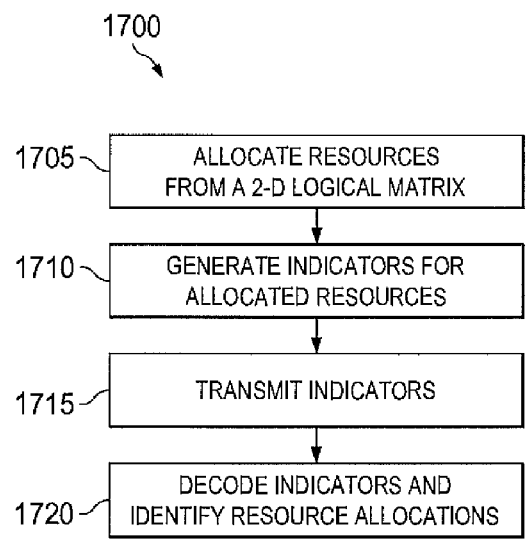
FIG. 17 illustrates a process for indicating a resource allocation according to embodiments of the present disclosure.

FIG. 17 illustrates a process for indicating a resource allocation according to embodiments of the present disclosure. The embodiment of the process 1700 shown in FIG. 17 is for illustration only. Other embodiments could be used without departing from the scope of this disclosure.

As stated herein above, in an OFDMA system, the available RUs are partitioned into one or multiple frequency partitions. Each frequency partition includes one or multiple RUs. For example, a frequency partition can include all RUs in the system. In additional examples, a frequency partition only consists of a portion of the RUs in the system. The usage pattern of different frequency partitions can be different in the entire network, thus enabling FFR.

After a two-dimensional resource matrix has been constructed, resources are allocated in block 1705. In block 1710, a number of indicators are generated. For example, the controller in a base station can generate two or more indicators using a tree structure, segment indicators, block indicators, best-M, or a combination of these. Thereafter in block 1715, the allocation indication process or device, such as the base station controller, can transmit the resource indicators to a number of subscriber stations in communication with the base station. In block 1720, the subscriber stations decode the indicators. The subscriber stations are configured to use the indicators to identify the allocated resources in the two-dimensional logical matrix. For example, the subscriber stations can use a reverse process of the process used by the base station such as, by identifying the nodes in a tree corresponding to the two-dimensional logical matrix.

Although the embodiments disclosed herein above illustrate a two-dimensional resource matrix by way of example, the concepts are equally applicable to matrices with higher dimensions. For example, a third dimension can be added to the resource matrix to accommodate resource allocation in a multiple-input multiple-output (MIMO) system. In that case, the third dimension represents the spatial dimension, which can be antennas, virtual antennas, spatial layers, spatial streams, or MIMO codewords.

In the examples discussed herein above, where operations or processes are disclosed as occurring at the base station, similar and reverse operations are performed at the subscriber station. For example, wherein the base station is configured to create a two-dimensional resource allocation matrix, the subscriber station has the knowledge of the two-dimensional resource allocation matrix, or the necessary information to construct the two-dimensional resource allocation matrix. The two-dimensional resource allocation matrix, or the necessary information to construct the two-dimensional resource allocation matrix, can be either specified in a standard or a protocol, or configured in the subscriber station, or communicated to the subscriber station. As a result, the subscriber station can determine a resource allocation from the two-dimensional resource allocation matrix. The subscriber station also can identify one or more indicators received from the base station and determine resource allocations within the two-dimensional resource allocation matrix from the indicators.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless communication network, a base station capable of communicating with a plurality of subscriber stations, the base station configured to allocate a plurality of resource units to at least one subscriber station, the base station comprising:
   a controller configured to allocate a plurality of resource units from a two-dimensional logical matrix of resource units, wherein the controller is configured to generate at least two indicator values, the at least two indicator values configured to identify the allocated resource units; and
   a transmitter configured to transmit the at least two indicators to the at least one of the plurality of subscriber stations, wherein the controller is configured to construct a first resource tree along a first dimension of the logical matrix and a second resource tree along a second dimension of the logical matrix, each of the resource trees comprising a plurality of nodes, and wherein the at least two indicator values comprise at least one node from the first resource tree and at least one node from the second resource tree.

2. The base station as set forth in claim 1, wherein the controller is configured to cause the transmitter to transmit at least one of a portion of the first tree and a portion of the second tree.

3. The base station as set forth in claim 1, wherein the controller is configured to cause the transceiver to transmit a first indicator in a first message and a second indicator in a second message.

4. The base station as set forth in claim 1, wherein the controller further is configured to construct the two-dimensional logical matrix of resource units, the logical matrix configured to be used to provide contiguous and diverse resource unit allocations.

5. For use in a wireless communication network, a base station capable of communicating with a plurality of subscriber stations, the base station configured to allocate a plurality of resource units to at least one subscriber station, the base station comprising:
   a controller configured to allocate a plurality of resource units from a two-dimensional logical matrix of resource units, wherein the controller is configured to generate at least two indicator values, the at least two indicator values configured to identify the allocated resource units; and
   a transmitter configured to transmit the at least two indicators to the at least one of the plurality of subscriber stations, wherein a first indicator value comprises a first contiguous segment of resource units in a first dimension of the logical matrix and a second indicator value comprises a second contiguous segment of resource units in a second dimension of the logical matrix.

6. For use in a wireless communication network, a base station capable of communicating with a plurality of subscriber stations, the base station configured to allocate a plurality of resource units to at least one subscriber station, the base station comprising:
   a controller configured to allocate a plurality of resource units from a two-dimensional logical matrix of resource units, wherein the controller is configured to generate at least two indicator values, the at least two indicator values configured to identify the allocated resource units; and
   a transmitter configured to transmit the at least two indicators to the at least one of the plurality of subscriber stations, wherein a first indicator value comprises a first corner of a contiguous block of resource units in the logical matrix and a second indicator value comprises a second corner of the contiguous block of resource units in the logical matrix.

7. For use in a wireless communication network, a base station capable of communicating with a plurality of subscriber stations, the base station configured to allocate a plurality of resource units to at least one subscriber station, the base station comprising:
   a controller configured to allocate a plurality of resource units from a two-dimensional logical matrix of resource units, wherein the controller is configured to generate at least two indicator values, the at least two indicator values configured to identify the allocated resource units; and
   a transmitter configured to transmit the at least two indicators to the at least one of the plurality of subscriber stations, wherein a first indicator value comprises a first plurality of columns of the logical matrix and a second indicator value comprises a second plurality of columns in the logical matrix.

8. For use in a wireless communication network, a base station capable of communicating with a plurality of subscriber stations, the base station configured to allocate a plurality of resource units to at least one subscriber station, the base station comprising:
   a controller configured to allocate a plurality of resource units from a two-dimensional logical matrix of resource units, wherein the controller is configured to generate at least two indicator values, the at least two indicator values configured to identify the allocated resource units; and
   a transmitter configured to transmit the at least two indicators to the at least one of the plurality of subscriber stations, wherein a first indicator value comprises at least one of:
   at least one node from a first resource tree along a first dimension of the logical matrix;
   a first contiguous segment of resource units in a first dimension of the logical matrix; and
   a first plurality of columns of the logical matrix; and
   wherein a second indicator value comprises at least one of:
   at least one node from a second resource tree along a second dimension of the logical matrix;
   a second contiguous segment of resource units in a second dimension of the logical matrix; and
   a first plurality of rows of the logical matrix.

9. For use in a wireless communication network, a base station capable of communicating with a plurality of subscriber stations, said base station comprising:
   a controller; and
   a transceiver, wherein the controller is configured to allocate resource units through at least one message transmitted from the transceiver to at least one of the plurality of subscriber stations, each resource unit comprising a time-frequency slot, and wherein the controller further is configured to construct a two-dimensional logical matrix of resource elements, the logical matrix adapted to enable contiguous and diverse resource unit allocations, wherein the one message comprises at least two indicator values, wherein a first indicator value comprises at least one of:
   at least one node from a first resource tree along a first dimension of the logical matrix;
   a first contiguous segment of resource units in a first dimension of the logical matrix; and
   a first plurality of columns of the logical matrix; and
   wherein a second indicator value comprises at least one of:
   at least one node from a second resource tree along a second dimension of the logical matrix;
   a second contiguous segment of resource units in a second dimension of the logical matrix; and
   a first plurality of rows of the logical matrix.

10. The base station as set forth in claim 9, wherein to construct the logical matrix, the controller is configured to
    collect a plurality of resource units of a frequency partition; and
    arrange the plurality of resource units into a logical matrix.

11. The base station as set forth in claim 10, wherein the controller further is configured to:
    permutate at least one of a pair of rows and a pair of columns.

12. The base station as set forth in claim 10, wherein the controller further is configured to:
    permutate at least one of a pair of rows and a pair of columns.

13. The base station as set forth in claim 12, wherein the controller further is configured to at least one of:
    allocate at least one row of the logical matrix; and
    allocate at least one column of the logical matrix.

14. The base station as set forth in claim 9, wherein the controller further is configured to perform multiple resource allocations on the logical matrix, the multiple resource allocations comprising
    an allocation of at least one row of the logical matrix; and
    an allocation of at least one column of the logical matrix.

15. The base station as set forth in claim 14, wherein the controller further is configured to allocate residual resource units in the logical matrix.

16. For use in a wireless network capable of communicating with a plurality of subscriber stations, a method of allocating resource units, each resource unit comprising a time-frequency slot, the method comprising:
    allocating a plurality of resource units from a two-dimensional logical matrix of resource units;
    generating at least two indicator values, the at least two indicator values configured to identify the allocated resource units;
    transmitting the at least two indicators to at least one of the plurality of subscriber stations; and
    constructing a first resource tree along a first dimension of the logical matrix and a second resource tree along a second dimension of the logical matrix, each of the resource trees comprising a plurality of nodes, wherein the at least two indicator values comprise at least one node from the first resource tree and at least one node from the second resource tree.

17. The method as set forth in claim 16, wherein transmitting comprises transmitting a first indicator in a first message and a second indicator in a second message.

18. The method as set forth in claim 16, further comprising constructing the two-dimensional logical matrix of resource units, the logical matrix configured to be used to provide contiguous and diverse resource unit allocations.

19. For use in a wireless network capable of communicating with a plurality of subscriber stations, a method of allocating resource units, each resource unit comprising a time-frequency slot, the method comprising:
    allocating a plurality of resource units from a two-dimensional logical matrix of resource units;
    generating at least two indicator values, the at least two indicator values configured to identify the allocated resource units; and transmitting the at least two indicators to at least one of the plurality of subscriber stations, wherein a first indicator value comprises a first contiguous segment of resource units in a first dimension of the logical matrix and a second indicator value comprises a second contiguous segment of resource units in a second dimension of the logical matrix.

20. For use in a wireless network capable of communicating with a plurality of subscriber stations, a method of allocating resource units, each resource unit comprising a time-frequency slot, the method comprising:
   allocating a plurality of resource units from a two-dimensional logical matrix of resource units;
   generating at least two indicator values, the at least two indicator values configured to identify the allocated resource units; and
   transmitting the at least two indicators to at least one of the plurality of subscriber stations, wherein a first indicator value comprises a first corner of a contiguous block of resource units in the logical matrix and a second indicator value comprises a second corner of the contiguous block of resource units in the logical matrix.

21. For use in a wireless network capable of communicating with a plurality of subscriber stations, a method of allocating resource units, each resource unit comprising a time-frequency slot, the method comprising:
   allocating a plurality of resource units from a two-dimensional logical matrix of resource units;
   generating at least two indicator values, the at least two indicator values configured to identify the allocated resource units; and
   transmitting the at least two indicators to at least one of the plurality of subscriber stations, wherein a first indicator value comprises a first plurality of columns of the logical matrix and a second indicator value comprises a second plurality of columns in the logical matrix.

22. For use in a wireless network capable of communicating with a plurality of subscriber stations, a method of allocating resource units, each resource unit comprising a time-frequency slot, the method comprising:
   allocating a plurality of resource units from a two-dimensional logical matrix of resource units;
   generating at least two indicator values, the at least two indicator values configured to identify the allocated resource units; and
   transmitting the at least two indicators to at least one of the plurality of subscriber stations,
   wherein a first indicator value comprises at least one of:
      at least one node from a first resource tree along a first dimension of the logical matrix;
      a first contiguous segment of resource units in a first dimension of the logical matrix; and
      a first plurality of columns of the logical matrix; and
   wherein a second indicator value comprises at least one of:
      at least one node from a second resource tree along a second dimension of the logical matrix;
      a second contiguous segment of resource units in a second dimension of the logical matrix; and
      a first plurality of rows of the logical matrix.

23. For use in a wireless network capable of communicating with a plurality of mobile stations, a method of allocating resource units each resource unit comprising a time-frequency slot, the method comprising:
   collecting, by a base station, a plurality of the resource units of a frequency partition;
   arranging the resource units into a logical matrix, wherein the logical matrix is adapted to enable contiguous and diverse resource unit allocations; and
   allocating resources based on the resource matrix by transmitting at least two indicator values, wherein a first indicator value comprises at least one of:
      at least one node from a first resource tree along a first dimension of the logical matrix;
      a first contiguous segment of resource units in a first dimension of the logical matrix; and
      a first plurality of columns of the logical matrix; and
   wherein a second indicator value comprises at least one of:
      at least one node from a second resource tree along a second dimension of the logical matrix:
      a second contiguous segment of resource units in a second dimension of the logical matrix; and
      a first plurality of rows of the logical matrix.

* * * * *